United States Patent
Spatscheck et al.

(10) Patent No.: US 10,051,089 B2
(45) Date of Patent: *Aug. 14, 2018

(54) ANYCAST TRANSPORT PROTOCOL FOR CONTENT DISTRIBUTION NETWORKS

(71) Applicant: AT&T Intellectual Property I, L.P., Atlanta, GA (US)

(72) Inventors: Oliver Spatscheck, Randolph, NJ (US); Seungjoon Lee, Basking Ridge, NJ (US); Michael Rabinovich, Solon, OH (US); Jacobus E. Van der Merwe, Salt Lake City, UT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,446

(22) Filed: Jul. 14, 2017

(65) Prior Publication Data

US 2017/0318127 A1  Nov. 2, 2017

Related U.S. Application Data

(63) Continuation of application No. 15/185,247, filed on Jun. 17, 2016, now Pat. No. 9,712,648, which is a continuation of application No. 14/750,644, filed on Jun. 25, 2015, now Pat. No. 9,407,729, which is a continuation of application No. 14/053,825, filed on
(Continued)

(51) Int. Cl.
*H04L 29/06* (2006.01)
*H04L 29/08* (2006.01)

(52) U.S. Cl.
CPC .......... *H04L 67/42* (2013.01); *H04L 67/1002* (2013.01); *H04L 67/2842* (2013.01)

(58) Field of Classification Search
None
See application file for complete search history.

(56) References Cited

U.S. PATENT DOCUMENTS 5,800,320 A    10/1998  Horikawa et al.
6,236,652 B1    5/2001  Preston et al.
(Continued)

OTHER PUBLICATIONS

Al-Qudah et al. "Anycast-Aware Transport for Content Delivery Networks," In: WWW : ACM, 2009, ISBN 978-1-60558-487-4, 10 pages.
(Continued)

*Primary Examiner* — Henry Tsang
(74) *Attorney, Agent, or Firm* — Akerman LLP; Michael K. Dixon; Mammen (Roy) P. Zachariah, Jr.

(57) ABSTRACT

A cache server for providing content includes a processor configured to receive a first datagram from a client system sent to an anycast address, send a response datagram to the client system in response to the first datagram, receive a request datagram from the client system sent to the anycast address, and send a batch of content datagrams to the client system. The first datagram includes a universal resource locator corresponding to the content. The response datagram includes a content identifier for the content. The request datagram includes the content identifier, an offset, and a bandwidth indicator. The batch of content datagrams includes a portion of the content starting at the offset.

20 Claims, 6 Drawing Sheets

Related U.S. Application Data

Oct. 15, 2013, now Pat. No. 9,100,462, which is a continuation of application No. 12/580,861, filed on Oct. 16, 2009, now Pat. No. 8,560,597.

(60) Provisional application No. 61/230,050, filed on Jul. 30, 2009.

(56) References Cited

U.S. PATENT DOCUMENTS

| | | |
|---|---|---|
| 6,327,252 B1 | 12/2001 | Silton et al. |
| 6,415,323 B1 | 7/2002 | McCanne |
| 6,687,731 B1 | 2/2004 | Kayak |
| 6,785,704 B1 | 8/2004 | McCanne |
| 6,920,129 B2 | 7/2005 | Preston et al. |
| 7,047,315 B1 | 5/2006 | Srivastava |
| 7,088,718 B1 | 8/2006 | Srivastava |
| 7,254,138 B2 | 8/2007 | Sandstrom |
| 7,254,636 B1 | 8/2007 | O'Toole et al. |
| 7,328,009 B2 | 2/2008 | Takeda et al. |
| 7,340,505 B2 | 3/2008 | Lisiecki et al. |
| 7,343,422 B2 | 3/2008 | Garcia-Luna-Aceves et al. |
| 7,330,906 B2 | 12/2008 | Hameleers et al. |
| 7,574,499 B1 | 8/2009 | Swildens et al. |
| 7,725,596 B2 | 5/2010 | Garcia-Luna-Aceves et al. |
| 7,734,730 B2 | 6/2010 | McCanne |
| 7,797,426 B1 | 9/2010 | Lyon |
| 2002/0004846 A1 | 1/2002 | Garcia-Luna-Aceves et al. |
| 2002/0016860 A1 | 2/2002 | Garcia-Luna-Aceves et al. |
| 2002/0026511 A1 | 2/2002 | Garcia-Luna-Aceves et al. |
| 2003/0014503 A1 | 1/2003 | Legout et al. |
| 2003/0051016 A1 | 3/2003 | Miyoshi |
| 2003/0079027 A1 | 4/2003 | Slocombe et al. |
| 2003/0105865 A1 | 6/2003 | McCanne et al. |
| 2003/0182410 A1 | 9/2003 | Balan et al. |
| 2003/0193958 A1 | 10/2003 | Narayanan |
| 2003/0236827 A1 | 12/2003 | Patel et al. |
| 2004/0054750 A1* | 3/2004 | de Jong ............ H04L 29/06027 709/217 |
| 2004/0107234 A1 | 6/2004 | Rajahalme |
| 2004/0143662 A1 | 7/2004 | Poyhonen et al. |
| 2004/0146045 A1 | 7/2004 | Jimmei et al. |
| 2004/0165565 A1 | 8/2004 | Omae et al. |
| 2005/0010653 A1 | 1/2005 | McCanne |
| 2005/0149531 A1 | 7/2005 | Srivastava |
| 2005/0164729 A1 | 7/2005 | Narayanan et al. |
| 2005/0198367 A1 | 9/2005 | Ettikan |
| 2005/0254419 A1 | 11/2005 | Barker et al. |
| 2006/0018299 A1 | 1/2006 | Yamamoto |
| 2006/0018317 A1 | 1/2006 | Jimmei |
| 2006/0095944 A1 | 5/2006 | Demircin et al. |
| 2006/0130064 A1 | 6/2006 | Srivastava |
| 2006/0193252 A1 | 8/2006 | Naseh et al. |
| 2006/0209885 A1 | 9/2006 | Hain et al. |
| 2006/0221866 A1 | 10/2006 | Shepherd |
| 2006/0236394 A1 | 10/2006 | Morrow et al. |
| 2006/0239241 A1 | 10/2006 | Eom et al. |
| 2007/0088708 A1 | 4/2007 | R. |
| 2007/0115814 A1 | 5/2007 | Gerla et al. |
| 2007/0133539 A1 | 6/2007 | Kang et al. |
| 2007/0243821 A1 | 10/2007 | Hundscheidt et al. |
| 2008/0080513 A1 | 4/2008 | Kang et al. |
| 2008/0082510 A1 | 4/2008 | Wang et al. |
| 2008/0123640 A1 | 5/2008 | Bhatia et al. |
| 2008/0126529 A1 | 5/2008 | Kim et al. |
| 2009/0022064 A1 | 1/2009 | Oron et al. |
| 2009/0049186 A1* | 2/2009 | Agnihotri .......... H04N 7/17336 709/231 |
| 2009/0113057 A1 | 4/2009 | Van der Merwe et al. |
| 2010/0131671 A1* | 5/2010 | Kohli .................. G06F 15/16 709/233 |
| 2010/0235542 A1 | 9/2010 | Visharam et al. |
| 2011/0082916 A1 | 4/2011 | Swanson et al. |
| 2011/0082944 A1 | 4/2011 | Swanson et al. |
| 2011/0173345 A1 | 7/2011 | Knox et al. |
| 2011/0246657 A1 | 10/2011 | Glow |
| 2011/0296048 A1 | 12/2011 | Knox et al. |
| 2012/0023198 A1 | 1/2012 | Swanson et al. |

OTHER PUBLICATIONS

Doi et al. "Protocol design for anycast communication in IPv6 network," Communications Computers and signal Processing, 2003 IEEE Pacific Rim Conference, Aug. 2003, 4 pages.

Kunga et al. "Efficient multimedia distribution architecture using anycast," Computer Communications, vol. 30, Issue 2 Jan. 15, 2007 14 pages.

Agarwal et al., "Content Distribution Architecture using Network Layer Anycast," In Proceedings of the IEEE Workshop on Internet Applications, San Jose CA, Jul. 2001, 9 pages.

Postal, "Request for Comments (RFC) 768: User Datagram Protocol," Aug. 28, 1980, 4 pages.

Partridge et al., "Request for Comments (RFC) 1546: Host Anycasting Service," Nov. 1993, 10 pages.

U.S. Appl. No. 12/268,744, filed Nov. 11, 2008.

Hussein et al., "Anycast CDNs Revisited," Case Western Reserve University, Cleveland OH, AT&T Labs—Research, Florham Park NJ 07932, WWW 2008, Beijing China, Apr. 21-25, 2008, pp. 277-286.

U.S. Appl. No. 12/542,439, filed Aug. 17, 2009.

* cited by examiner

ANYCAST TRANSPORT PROTOCOL FOR CONTENT DISTRIBUTION NETWORKS

CROSS-REFERENCE TO RELATED APPLICATION(S)

This application is a continuation of and claims priority to U.S. patent application Ser. No. 15/185,247, filed on Jun. 17, 2016, which is a continuation of U.S. patent application Ser. No. 14/750,644, filed on Jun. 25, 2015, now U.S. Pat. No. 9,407,729, which is a continuation of and claims priority to U.S. patent application Ser. No. 14/053,825, filed on Oct. 15, 2013, now U.S. Pat. No. 9,100,462, which is continuation of U.S. patent application Ser. No. 12/580,861, filed on Oct. 16, 2009, now U.S. Pat. No. 8,560,597, which claims priority to U.S. Provisional Patent Application Ser. No. 61/230,050, filed on Jul. 30, 2009, all of which are herein incorporated by reference in their entireties.

FIELD OF THE DISCLOSURE

The present disclosure generally relates to communications networks, and more particularly relates to anycast transport protocol for content distribution networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
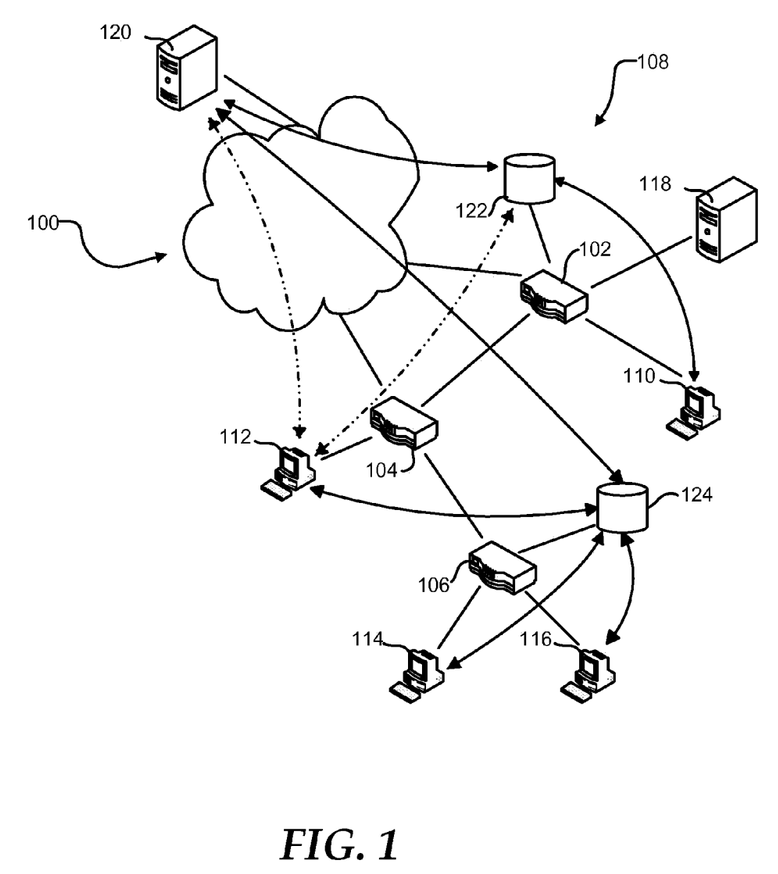
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
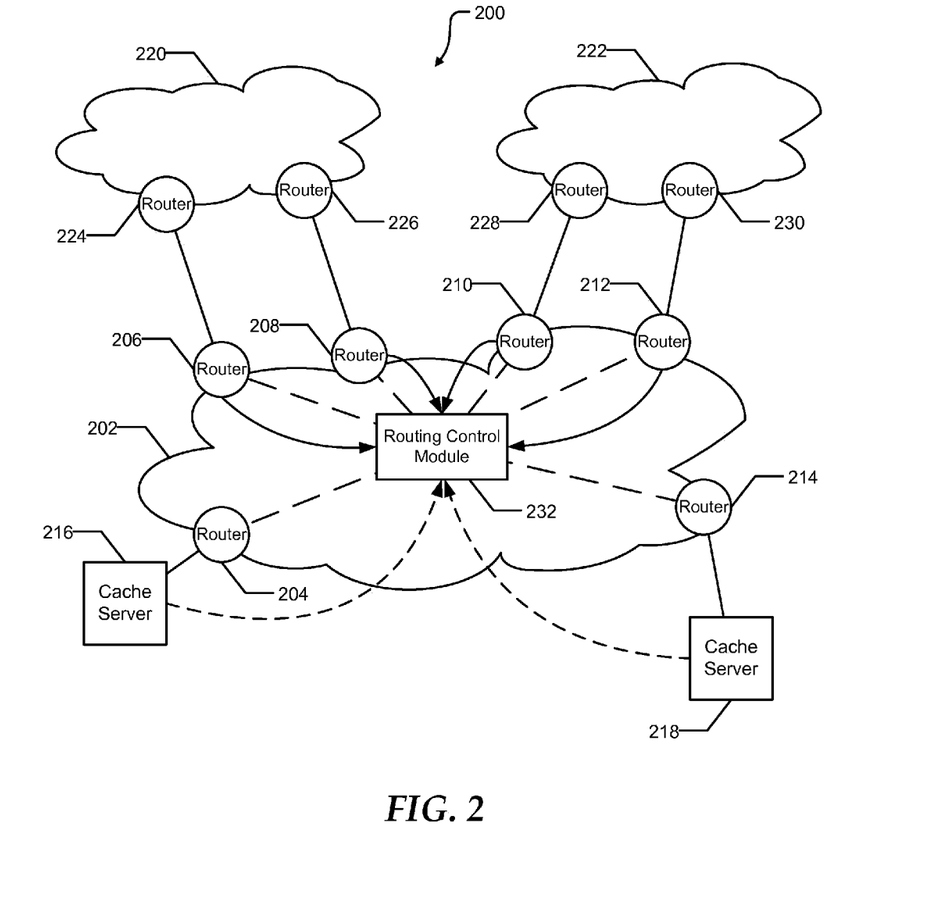
FIG. 2 is block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204 through 214. The provider edge routers 204 through 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a routing control module 232. The routing control module 232 can exchange routes with provider edge routers 206 through 212 within the CDN provider network 202. As such, the routing control module 232 can influence the routes selected by the provider edge routers 206 through 212. Additionally, the routing control module 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the routing control module 232. The routing control module 232 can provide a route to the anycast address to each of the provider edge routers 206 though 212. Provider edge routers 206 through 212 can direct traffic addressed to the anycast address to either of the cache servers 216 and 218 based on the routes provided by the routing control module 232. Additionally, the provider edge routers 206 through 212 can advertise the anycast address to AS 220 and to AS 222. The routing control module 232 can manipulate the route provided to provider edge routers 206 through 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it can be undesirable to provide an anycast addresses to client systems within an unstable network that can be subjected to frequent internal routing changes.

The routing control module can be implemented in hardware, software, or any combination thereof. The routing control module may include one or more computer systems. When a module includes more than one computer system, the functions of the module can be distributed across the multiple computer systems in a symmetric manner, such as where each computer system performs the same type of tasks, or in an asymmetric manner, such as where two computer systems of the module may perform different tasks.

Figure 3:
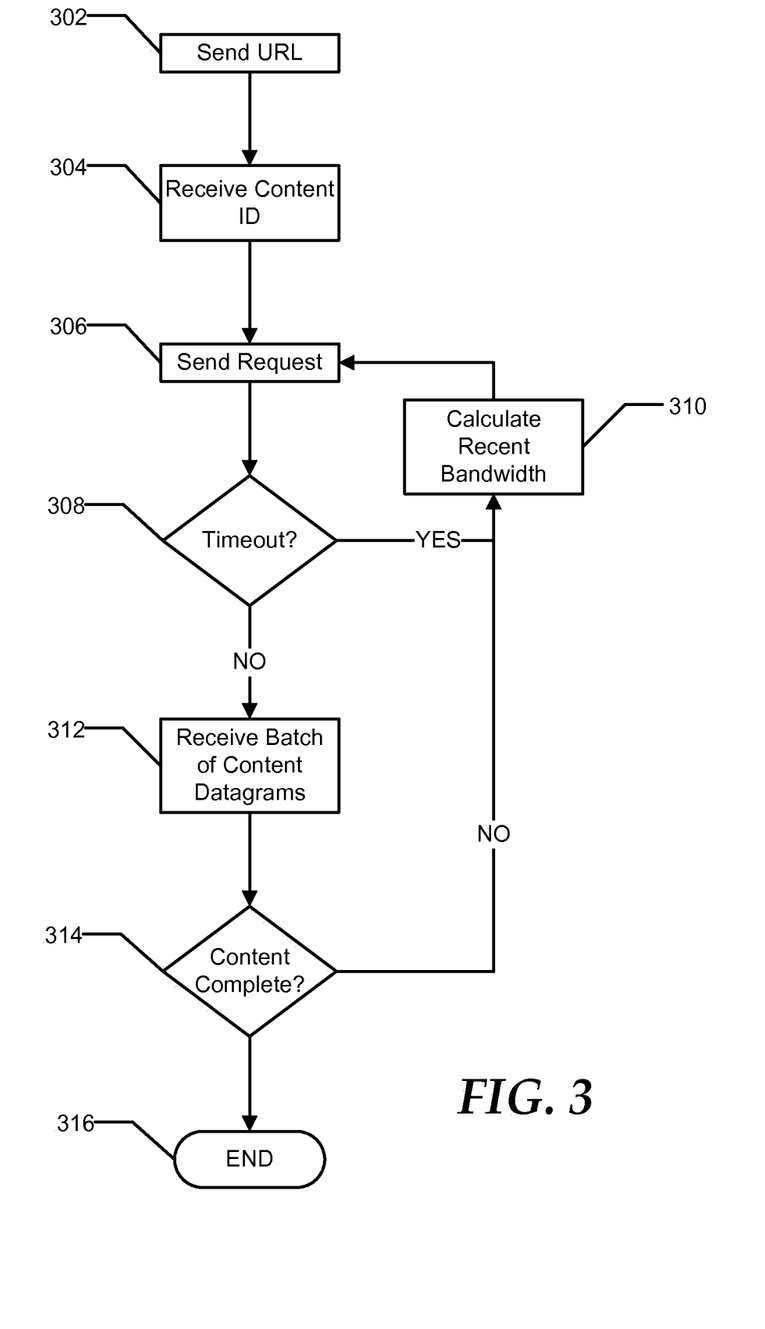
FIG. 3 is a flow diagram illustrating an exemplary method of receiving content in accordance with one embodiment of the present disclosure.

FIG. 3 illustrates an exemplary method of receiving content from an anycast aware content delivery network. At 302, a client system can send a datagram to an anycast address for the content delivery network. As a result of the routing policy, a first cache server responding to the anycast address can receive the request. The datagram can include a universal resource locator (URL). Additionally, the datagram can be sent using a connectionless protocol.

Generally, connectionless protocols can provide for sending a message from one system to another without prior arrangement. A sending device can send one or more packets or datagrams without first ensuring the receiving device is available and ready to receive the data. Additionally, connectionless protocols may not define mechanisms to maintaining a state of the connection or verify the recipient received the message. Using a connectionless protocol, there is no overhead for setting up a connection and the end-point devices may not need to reserve resources related to connection. Examples of connectionless protocols include User Datagram Protocol (UDP), Internet Control Message Protocol (ICMP), Transparent Interprocess Communication Protocol (TIPC), Internet Package Exchange Protocol (IPX), and the like.

In contrast, a connection-oriented protocol can define a procedure for establishing a connection prior to sending the message, such as a three-way handshake defined by Transmission Control Protocol (TCP). Additionally, connection-oriented protocols can define mechanisms for verifying delivery of the message, such as an ACK message of TCP, and maintaining the state of the connection. Once the connection is established, the end point devices can be required to track the state of the connection and to reserve resources related to the connection until the connection is closed or times out.

At 304, the client system can receive a content identification (content ID). The content ID can include an identifier for the content represented by the URL. Additionally, the content ID may include a representation of the client system's address. Further, the content ID may be cryptographically signed or encrypted to reduce the likelihood of a rogue client system hijacking the content requested by the client system.

At 306, the client system can send a request datagram to the anycast address including the content ID, an offset, and a bandwidth indicator. The offset can indicate the beginning of the next portion of the content, such as a number of the next byte. The bandwidth indicator can include a receive bandwidth of the client for recently received data. In an embodiment, the first request datagram may not include an offset or a bandwidth indicator. In an alternate embodiment, in addition to the content ID, the client system may receive a first portion of the content in response to the datagram containing the URL.

At 308, the client system can determine if a timeout has occurred while waiting to receive a portion of the content. If a timeout has occurred, the client system can calculate a recent bandwidth for a portion of the content that has been received, as illustrated at 310. At 306, the client system can send another request for the content, along with an updated bandwidth indicator and an updated offset. Alternatively, if a timeout has occurred, the bandwidth indicator may be reset to a base rate on the assumption that the timeout was a result of the loss of one or more datagrams due to a packet buffer overflow at a router along the path between the cache server and the client system.

Alternatively, when a timeout has not occurred at 308, the client system can receive a batch of content datagrams, as illustrated at 312. The batch of content datagrams can be limited to a maximum number of content datagrams. The maximum number of content datagrams may be a fixed limit or may be a dynamic limit based on network conditions, such as receive bandwidth for recently received data, network congestion, cache server utilization, frequency of routing changes, or the like. In an embodiment, each content datagram may indicate the number of content datagrams within the batch.

At 314, the client system can determine if the content is complete. At 316, if the content is complete, the process can end at 316. Alternatively, if the content is not complete, the client system can calculate the recent bandwidth, as illustrated at 310, and the client system can send another request datagram for a next portion of the content, as illustrated at 306. In an embodiment, the bandwidth indicator may be increased by a small amount if all content datagrams of the batch were received correctly.

Figure 4:
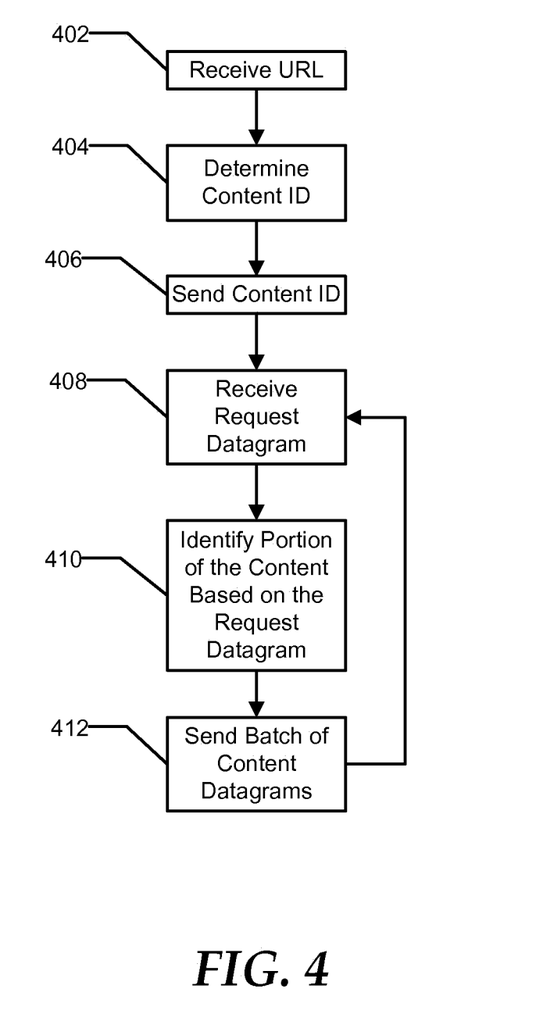
FIG. 4 is a flow diagram illustrating an exemplary methods of providing content in accordance with one embodiment of the present disclosure.

FIG. 4 illustrates an exemplary method of providing content. At 402, a cache server can receive a datagram including a URL. The datagram can be sent using a connectionless protocol, such as UDP. At 404, the cache server can determine a content ID for the content represented by the URL. The content ID can identify the content. Additionally, the content ID may identify the client system. At 406, the cache server can send a response datagram including the content ID to the client system.

At 408, the cache server can receive a request datagram from the client system. The request datagram can include the content ID, an offset, and a bandwidth indicator. At 410, the cache server can identify a portion of the requested content based on the content ID, the offset, and a maximum number of content datagrams per batch. The maximum number of content datagrams per batch can be a fixed number or depend on network conditions, as previously discussed. In an embodiment, the cache server can verify, based on the content ID, that the request was sent by the client system rather than a rouge system attempting to hijack the content requested by the client system.

At 412, the cache server can send a batch of content datagrams to the client system including the identified portion of the requested content. The cache server may limit the rate the batch of datagrams is sent based on the bandwidth indicator. For example, the rate may be not greater than the bandwidth indicator. Limiting the rate can be effective to prevent the batch of datagrams from saturating a link on the path between the cache server and the client system. A saturated link may result in one or more of the datagrams being dropped when a router overflows a packet buffer. Alternatively, the rate may be slightly greater than the bandwidth indicator to attempt to increase the data rate over time.

In an embodiment, each content datagram may include a few bytes of bandwidth verification data. The client system can assembly the bandwidth verification data for the batch of content datagrams and provide the bandwidth verification data or a hash thereof along with the bandwidth indicator in a subsequent request. The cache server can verify the authenticity of the bandwidth indicator using the bandwidth verification data or hash to ensure that the client system has received the portion of the content.

Figure 5:
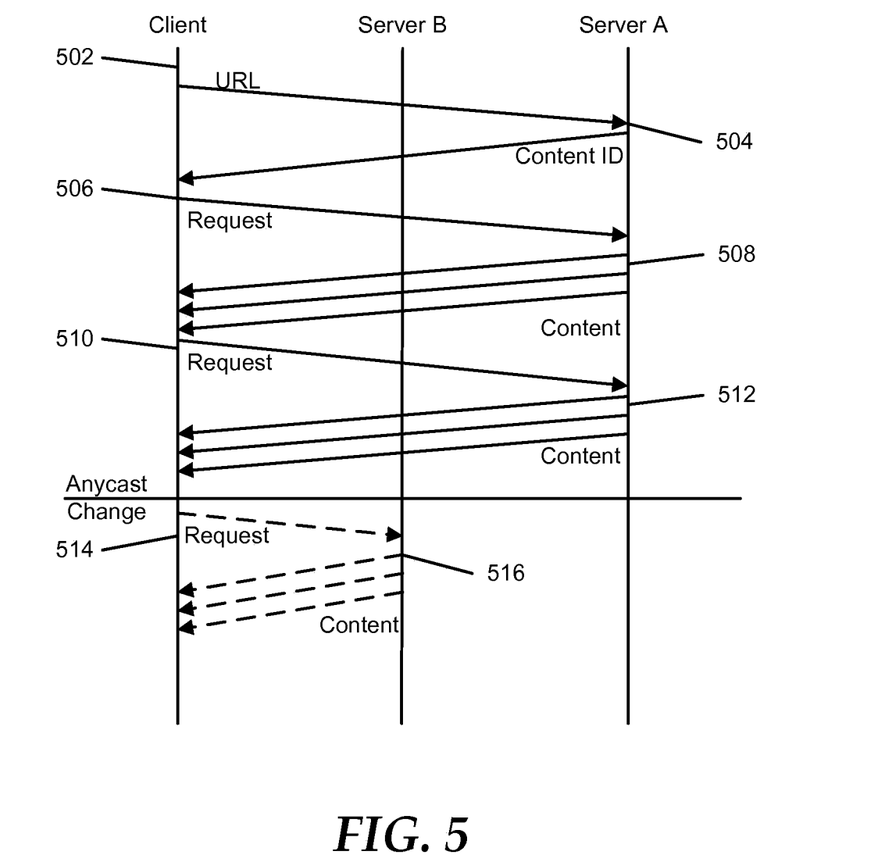
FIG. 5 is a timing diagram illustrating an exemplary process for providing content to a client system.

FIG. 5 is a timing diagram illustrating the communication between a client system and two cache servers according to an exemplary embodiment. The communication between the client system and the two cache servers can utilize a connectionless protocol, such as UDP. At 502, the client system can send a datagram including a URL to an anycast address for the CDN. Using the anycast address, the network can route the datagram to server A. At 504, server A can send a datagram including a content ID to the client. The content ID can be an identifier that uniquely identifies the data file located at the URL.

In an embodiment, the content ID can also include an identifier corresponding to the address of the server. Additionally, the content ID may be encrypted and/or cryptographically signed. In another embodiment, server A may also send a batch of content datagrams including a first portion of the content after receiving the URL datagram.

At 506, the client system can send a request datagram to the anycast address which can be routed to server A. The request datagram can include the content ID, an offset, and a bandwidth indicator. The offset can include a starting byte number of the next portion of the content. The bandwidth indicator can include the receive bandwidth of the client for recently received data. At 508, the client system can send a batch of content datagrams including the next portion of the content. The next portion of the content can begin at the starting byte number indicated by the offset. Additionally, the number of content datagrams in the batch can be limited to a maximum number of datagrams per batch.

At 510, after receiving the batch of content datagrams sent by server A at 508, the client system can send another request datagram to the anycast address. The offset including in the request datagram can be updated to indicate the next portion of the content begins after the recently received portion of the content. Additionally, the bandwidth indicator can be updated to correspond to the receive bandwidth for the recently received portion of the content. Based on the anycast address, the network can send the request datagram to server A. At 512, server A can send another batch of content datagrams to the client system.

At 514, after receiving the batch of content datagrams sent by server A at 512, the client system can send another request datagram to the anycast address. As previously discussed, the offset and the bandwidth indicator can be update. Sometime between the request datagram sent by the client system at 510 and the request datagram sent by the client system at 514, the network routing may have been changed. A change in the network routing may not affect the delivery of the content datagrams to the client system because the content datagrams are addressed to an address unique to the client system rather than an anycast address. Accordingly, based on the anycast address, the request datagram can be routed to server B rather than server A. At 516, server B can send a batch of content datagrams to the client system including the next portion of the content.

Figure 6:
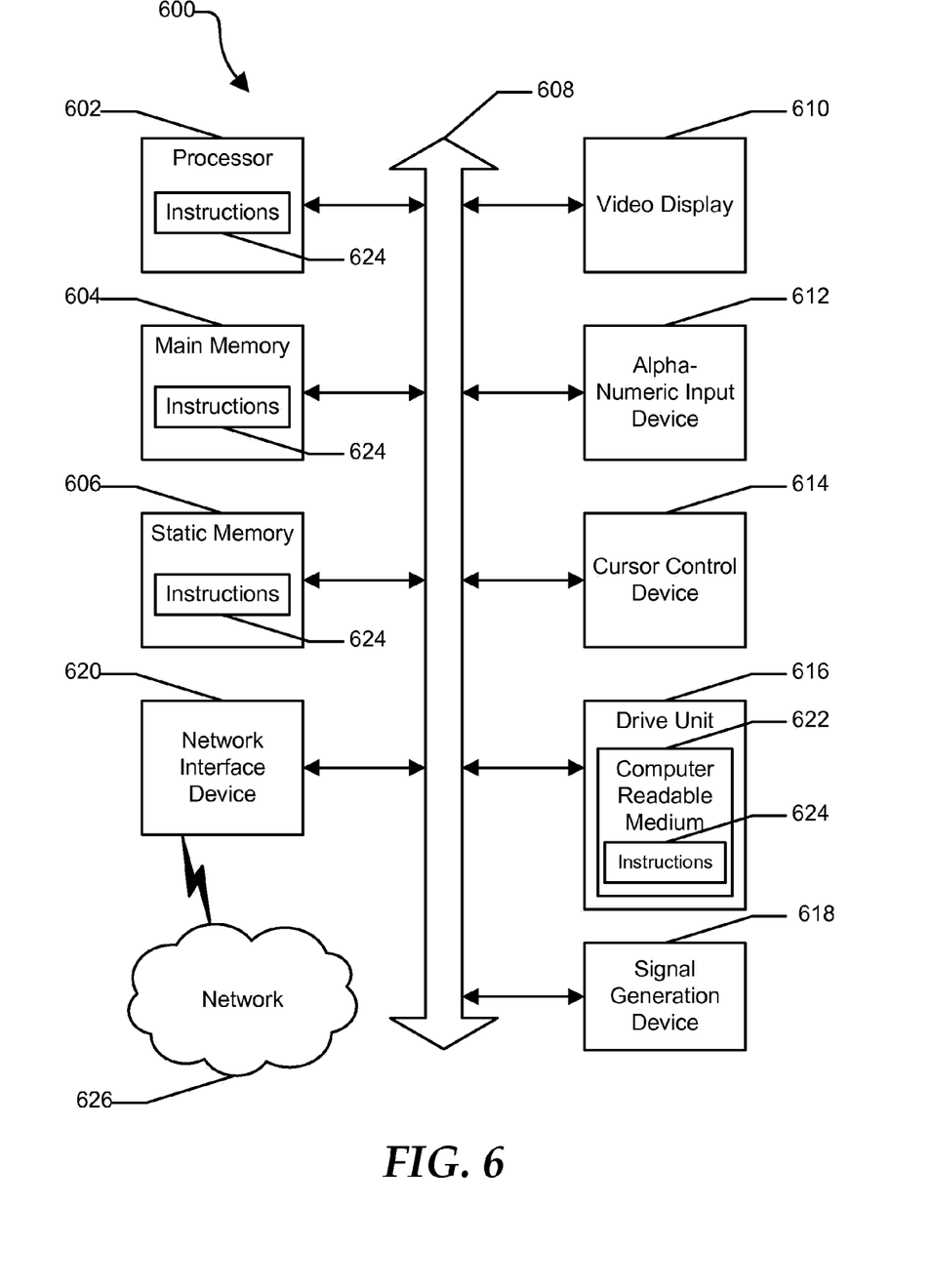
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
    a memory that stores instructions;
    a processor that executes the instructions to perform operations, the operations comprising:
        providing, to a client system and in response to a first request datagram sent to an internet protocol address, a first content datagram including a portion of content, and
        wherein the first request datagram includes a bandwidth indicator that is provided based on a timeout occurring while the client system is waiting to receive the portion of the content.

2. The system of claim 1, wherein the operations further comprise receiving the first request datagram sent to the internet protocol address.

3. The system of claim 1, wherein the operations further comprise transmitting a content identifier associated with the content.

4. The system of claim 1, wherein the operations further comprise receiving, with the first request datagram, an offset indicating a beginning of a next portion of the content.

5. The system of claim 1, wherein the operations further comprise limiting a rate at which a batch of content datagrams are sent to the client system based on the bandwidth indicator.

6. The system of claim 5, wherein the operations further comprise verifying an authenticity of the bandwidth indicator.

7. The system of claim 1, wherein the operations further comprise identifying the portion of the content based on a content identifier included within the first request datagram.

8. The system of claim 1, wherein the operations further comprise providing, to the client system, a batch of content datagrams associated with the content if the timeout has not occurred.

9. The system of claim 8, wherein the operations further comprise limiting the batch of content datagrams to a predefined maximum number of content datagrams.

10. The system of claim 9, wherein the operations further comprise setting the predefined maximum number of content datagrams based on network conditions.

11. The system of claim 8, wherein the operations further comprise indicating a number of content datagrams within the batch.

12. The system of claim 1, wherein the operations further comprise verifying, based on a content identifier included within the first request datagram, that the first request datagram was sent by the client system.

13. The system of claim 12, wherein the operations further comprise sending a response datagram including a content identifier to the client system.

14. A method, comprising:
    transmitting, to a client system and in response to a first request datagram sent to an internet protocol address, a first content datagram including a portion of content, wherein the first content datagram is transmitted by utilizing instructions from a memory that are executed by a processor, and
    wherein the first request datagram includes a bandwidth indicator that is provided based on a timeout occurring while the client system is waiting to receive the portion of the content.

15. The method of claim 14, further comprising receiving the first request datagram sent to the internet protocol address.

16. The method of claim 14, further comprising resetting the bandwidth indicator to a base rate if the timeout was a result of a loss of a datagram due to a packet buffer overflow.

17. The method of claim 14, further comprising receiving, with the first request datagram, an offset indicating a beginning of a next portion of the content.

18. The method of claim 14, further comprising setting a maximum number of content datagrams based on network conditions.

19. The method of claim 14, further comprising transmitting a content identifier associated with the content.

20. A computer-readable device comprising instructions, which, when loaded and executed by a processor, cause the processor to perform operations, the operations comprising:
    providing, to a client system and in response to a first request datagram sent to an internet protocol address, a first content datagram including a portion of content, and
    wherein the first request datagram includes a bandwidth indicator that is provided based on a timeout occurring while the client system is waiting to receive the portion of the content.

* * * * *